July 18, 1972 P. W. VOGEL 3,677,775
METHOD OF PREPARING AND PACKAGING PORTION
SHAPED MEAT PRODUCTS
Original Filed Feb. 11, 1969
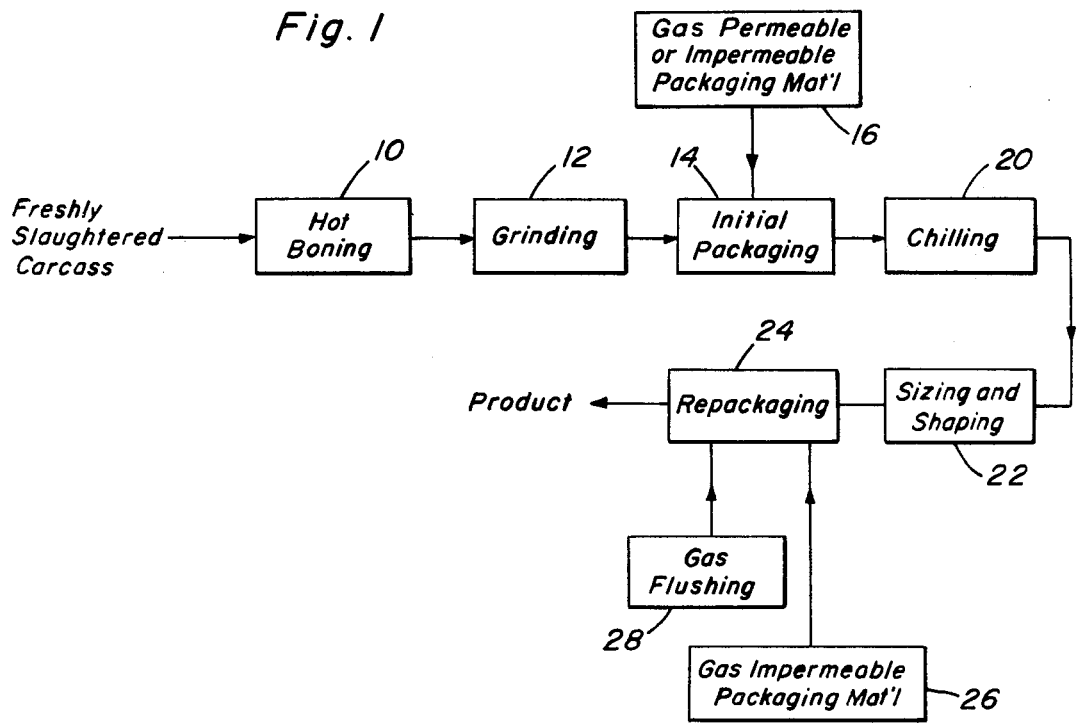
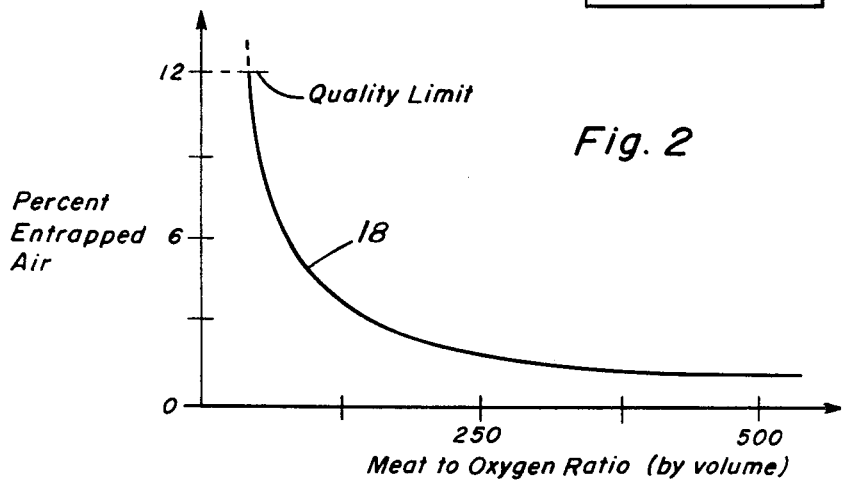
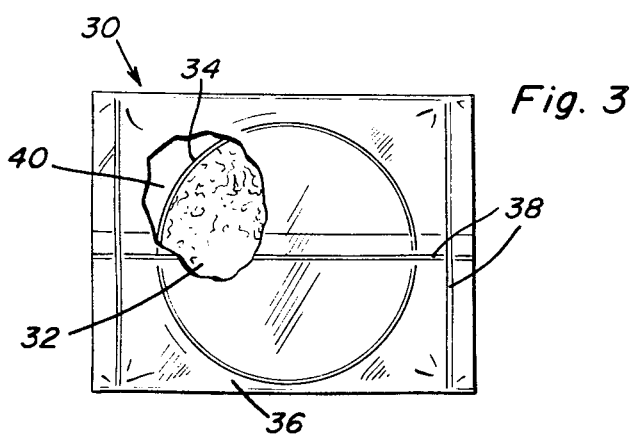
Paul W. Vogel
INVENTOR
BY Clarence A. O'Brien
and Harvey B. Jacobson
Attorneys United States Patent Office 3,677,775
Patented July 18, 1972

3,677,775
METHOD OF PREPARING AND PACKAGING PORTION SHAPED MEAT PRODUCTS
Paul W. Vogel, Pekin, Ill., assignor to Bird Provision Co.
Continuation of abandoned application Ser. No. 798,421, Feb. 11, 1969. This application June 2, 1971, Ser. No. 149,388
Int. Cl. A22c *18/00;* B65b *25/06*
U.S. Cl. 99—174
23 Claims

ABSTRACT OF THE DISCLOSURE

Meat that is shaped and sized into individual consumer portions after initial packaging, is sealed for prolonged storage in a gas-impermeable re-packaging material. Prior to initial packaging, the meat is ground while in a warm and fluent state shortly after slaughter of the animal. After shaping and sizing the meat into consumer portions, it is gas flushed during repackaging to reduce the amount of entrapped oxygen.

---

This application is a streamline continuation of application Ser. No. 798,421.

This invention relates to the preparation and packaging of ground meat and more particularly to fresh ground meat in portion size and shape for direct consumer use.

National distribution of frozen food products involves on the average, approximately three to four months between manufacture and consumption by the ultimate consumer. With certain food products such as poultry, because of seasonal restrictions on growth and slaughter, as much as one year may elapse before consumption. Distribution of other food products is also geographically limited at the present time because they must be handled in a fresh state. For example, products such as fresh pork sausage, patties, baby links and hog casing coils have a restricted shelf life of seven to ten days in the retail meat case. In connection with the latter type of products, a packaging technique that would increase the shelf life to a period over three weeks would therefore be of considerable benefit in removing geographical limitations on distribution.

Thus, there is at present a need for a pre-seasoned, fresh or frozen meat product that offers to the ultimate consumer the convenience of a portion controlled serving and yet have the shelf life necessary to maintain selling quality during the time required for widespread distribution and sale to the ultimate consumer.

The method of the present invention resides in the discovery that meat products prepared and packaged in accordance with the disclosure in U.S. Pat. No. 3,124,462 to Vogel et al. may be re-packaged in portion size and shapes for ultimate consumer use to thereby avoid waste. Re-packaging of the final product is effected in such a manner as to circumvent the problems of rancidity and discoloration for an extended period of time far exceeding that of products package and processed in the conventional manner. Except for the selection of the packaging material and the tolerable quantity of entrapped air, the meat to be prepared and packaged up to the initial packaging step is in accordance with the procedures set forth in the aforementioned patent to Vogel et al. The meat is initially packaged in bulk form alternatively within a gas-permeable or a gas-impermeable packaging material, limiting the percentage of air entrapped within the initial package to less than 12% by volume. If a gas-impermeable material is utilized for initial packaging, re-packaging of the meat in portion size and shape may be delayed for a prolonged period of time provided the initially packaged meat is held in freezer storage. On the other hand, the meat may be initially packaged in a gas-permeable material in which case processing and re-packaging must be completed promptly. In either event, the initially packaged meat must be chilled before it is shaped and/or sized. Following the chilling step, the initially packaged meat may be sliced, for example, in order to divide it into portion controlled servings. The portion sized and shaped meat is then re-packaged in a gas-impermeable material. During re-packaging however, the package interior is gas flushed so as to reduce the entrapped oxygen. The oxygen level in the head space of the final package must be no more than 1% by volume while the volumetric ratio of meat to oxygen must be at least 300:1 in order to produce a satisfactory product having the requisite, extended shelf life necessary for widespread product distribution and consumption.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a block flow diagram illustrating the basic method of the present invention.

FIG. 2 is a graphical illustration pertaining to one of the limiting factors associated with the method of the present invention.

FIG. 3 is an illustration of a typical product of the method of the present invention.

Referring now to the drawings in detail, and initially to FIG. 1, it will be noted that the meat constituting the raw material of the method is obtained from a freshly slaughtered carcass. The present invention contemplates that this meat may be pork, beef, veal or poultry. The meat is obtained from the carcass by hot boning thereof as indicated by reference numeral 10 in FIG. 1. Desired proportions of the fat and lean may then be batched for grinding or comminution as indicated by reference numeral 12. Also, seasoning and/or salt may be added to the meat. The meat is then stuffed into an initial bulk package as indicated by the initial packaging step 14 in FIG. 1. The preparation and initial packaging of the meat is performed within a limited period of time following slaughter of the animal from which the meat is derived as described for example in the aforementioned U.S. Pat. No. 3,124,-462 to Vogel et al. in connetcion with pork. Therefore, pursuant to this patent, initial packaging is completed within the limited period of time during which the meat remains in a fresh, warm and fluent state under ambient processing plant conditions. The packaging material within which the meat is initially packaged, as indicated by reference numeral 16, is either of the gas-impermeable type as required in the aforementioned patent to Vogel et al. or may alternatively be of the gas-permeable type.

In preparing and packaging meat in accordance with the aforementioned patent to Vogel et al., a certain quantity of air is entrapped with the meat within its package. The volumetric ratio of meat to oxygen within the package is a function of the percent of air entrapped as indicated by the curve 18 in FIG. 2. It has been found, that successful practice of the method of the present invention requires that the percent of entrapped air be below a quality limit of 12% as indicated in FIG. 2. In this regard, it will be appreciated that the quantity of oxygen initially present is an important factor with respect to the development of rancidity.

As indicated by reference numeral 20 in FIG. 1, the step following initial packaging of the meat is a chilling step during which the physical properties of the meat are changed to enable subsequent sizing and shaping of the meat into portion form as denoted by reference numeral 22 in FIG. 1. There may be a delay between the initial packaging step 14 and the chilling step 20 dependent upon the permeability of the initial packaging material. If an air-impermeable packaging film is utilized, a delay in cold storage for extended periods of time is possible so that the initially packaged meat may be shipped to other locations at which processing is completed or merely held in storage for completion of processing as the need or demand arises. On the other hand, if the initial packaging material is of the gas-permeable type such as cellophane, polyethylene, fibrous casings and natural casings, the storage time will be governed by the time in which transmission of oxygen through the packaging material causes sufficient breakdown or chemical reaction in the meat to cancel the advantages of re-packaging in accordance with the subsequent steps of the method.

The meat is reduced in temperature to a value between 28° F. and 32° F. during the chilling step 20 in order to establish optimum conditions under which it is sized and shaped by means of conventional slicing equipment. The initial packaging material may either be stripped from the meat prior to slicing or left on. If the initial packaging material is left on, slicing may be performed at higher temperatures in which case, the temperature of the meat may be reduced during the chilling step immediately preceding slicing to a range having an upper limit of 42° F. Under the foregoing conditions, clean cut patty slices may be produced. In addition to increasing the upper limit of the temperature range, by leaving the initial packaging film on the periphery of the meat slices, the tendency of the meat to flatten or flare at the peripheral edges of the patty slices will be minimized during subsequent processing of the meat product.

The portion sized and shaped meat undergoes a final re-packaging step as indicated by reference numeral 24 in FIG. 1 utilizing a gas-impermeable packaging material, as indicated by reference numeral 26. Further, during re-packaging, most of the air within the interior of the package is displaced by a preservative gas such as carbon dioxide or nitrogen as indicated by reference numeral 28 in FIG. 1.

In connection with the final re-packaging step, an important requirement is that the oxygen within the head space of the package be maintained below a maximum quantity and that the gas flushing reduce the oxygen content of the sealed enclosure of the package and maintain a volumetric meat-to-oxygen ratio above a certain minimum value. The term "head space" as used herein refers to the space ultimately existing between the body of the meat and the internal surfaces of the package. Packaging apparatus capable of performing the latter-mentioned re-packaging step is presently available such as a machine disclosed in Pat. No. 2,919,990 to Podlesak et al.

FIG. 3 illustrates a typical final product of the present method generally denoted by reference numeral 30. The product includes by way of example a single meat patty slice 32 peripherally encircled by the initial packaging material 34. The patty slice is sealed within the outer packaging material 36. Heat seals 38, as indicated in FIG. 3, seal an enclosed volume occupied by the meat patty and an evacuated, and gas flushed head space 40. The packaging material 36 must be air-impermeable as hereinbefore indicated while the oxygen level within the head space 40 must be no more than approximately 1%. Further, the oxygen content of the total enclosed package volume must be reduced by the gas flushing to obtain a volumetric meat-to-oxygen ratio of approximately 300:1 or more. It should be appreciated, that the prolonged frozen storage or shelf life of the product may be further extended by lowering the volume of oxygen in the head space and increasing the meat-to-oxygen ratio from the aforementioned limiting values given. Also, the final package may enclose more than one meat patty if desired.

TESTING

Various factors or process conditions were considered in obtaining the various method limits consisting of the initial process time, the initial packaging material, the delay in repackaging, product size and shape, flushing gas, final packaging material, percent oxygen entrapped, meat-to-oxygen ratio, and final storage temperature. Tests were performed for example in order to determine the maximum permissible process time up through the initial packaging step. Utilizing a freshly slaughtered hog carcass, meat having a 40% pork fat, and 60% lean content, was ground and seasoned before stuffing in one inch diameter natural hog casings. Test samples prepared within initial process times of 2½ hours, 3 hours, 3½ hours, 4 hours, and 4½ hours were prepared. The stuffed hog casings were then placed in coil form within an air-impermeable foil pan, flushed with nitrogen gas and then hermetically sealed. The percent head space oxygen entrapped within the various test samples was between one-half to one percent of the enclosed package volume while the meat-to-oxygen ratio was between 540:1 and 1080:1. The finally re-packaged product was then stored in a freezer at 0° F. Those test samples which were initially processed beyond 4½ hours had an acceptable storage life of less than 4 weeks, while the acceptable storage life of the other test samples was at least 146 weeks. It will therefore be appreciated that the initial process time is a critical factor insofar as pork is concerned.

Test samples of the same meat content were also prepared within an initial time of 3½ hours and stuffed within in a 1½ ounce foil container as the initial packaging material. There was a substantial delay such as five days in re-packaging of the meat while it was held in cold storage at 0° F. The meat was then transferred to a larger two ounce foil container within which it was gas flushed and hermetically sealed. The percent oxygen entrapped within the head space of the final package was between one-half and nine-tenths of 1% while the meat-to-oxygen ratio was between 300:1 and 600:1. In gas flushing the meat during final re-packaging, three different gases were utilized consisting of nitrogen, carbon dioxide and air. The various test samples were then stored at 0° F. and it was found that the test samples flushed with air had an acceptable storage life of less than three weeks whereas the samples flushed with nitrogen and carbon dioxide were acceptable after a storage life of one year and four months.

EXAMPLES

One example of a product produced in accordance with the method of the present invention is a ground and seasoned pork patty having a 40% pork fat and 60% lean content. Initial processing of this product in accordance with the disclosure in the aforementioned U.S. Pat. to Vogel et al., was performed within 3½ hours. However, a gas-permeable packaging material was utilized in the form of a one inch diameter natural hog casing. As the final gas-impermeable packaging material, a foil pan was utilized and nitrogen as the flushing gas. With ½%–1% entrapped head space oxygen in the final package and a meat-to-oxygen ratio of 540:1 to 1080:1, an acceptable storage life of over three weeks was obtained under a storage shelf temperature of 35 to 38° F.

As a second example, ground and seasoned pork having a content as described in connection with the first mentioned example was processed within an initial process time of 3½ hours and stuffed within a .005 inch gauge white polyethylene film tube of 3.75 inch diameter. The initially packaged meat was stored at 30° F. for 30 hours before being sliced into one half inch thick patties. The sliced patties were finally re-packaged within an air-impermeable material known as "Curpolene." This film is a laminate of 50 gauge biaxially orientated polypropylene, 50 gauge low density polyethylene, 250 gauge K-cellophane and 250 gauge low density polyethylene, one of the examples disclosed in U.S. Pat. No. 3,274.004, issued Sept. 20, 1966 to Curler et al. This product was gas flushed with a mixture of 70% $CO_2$ and 30% nitrogen resulting in entrapped oxygen of ½% to 1% by volume and a meat-to-oxygen ratio of 300:1 to 600:1. A storage life of over six months was obtained at 0° F.

A third example is a pork patty product similar to the second example described except that the initially packaged meat was stored at 30° F. for four hours before slicing, and the final package enclosed two, one-half inch thick patty slices gas flushed with nitrogen alone. A storage life of over seven months was obtained with the percent head space oxygen entrapped being one-half to three-quarters of 1% while the meat-to-oxygen ratio was between 318:1 and 466:1.

A fourth example is a ground beef patty product having a meat content of 25% beef fat and 75% lean with 1% salt added. This product was initially processed in a warm and fluent state of the meat within three hours from slaughter utilizing a 2½ inch diameter "saran" chub packaging film tube. The initially packaged meat was stored at 0° F. for periods of one month to 17 months before being siced into one-quarter inch thick slices. Four of such patty slices were re-packaged in a single final package utilizing a "saran" film while flushing the meat with carbon dioxide. With ½% to 1% oxygen entrapped within the final package, a storage life of over three weeks was obtained under a storage shelf temperature of 35° F.

The marketing of meat in portion controlled serving sizes has been attempted in the past with unseasoned pork patties utilizing a polyethylene packing material. Marketing of such portion sized meat products has been unsuccessful because distribution was not possible before the product became unsalable due to development of rancidity and discoloration. The advantage of the present invention will therefore be apparent since meat patties may not only be stored for the requisite period of time to permit widespread distribution but the product may also be preseasoned. The extended storage life is also maintained despite the use of salt in certain products. The foregoing advantages are made possible only when the meat is hot processed while in a warm and fluent state within a limited period of time following slaughter and utilizing an air-impermeable re-packaging material with the oxygen level in the head space thereof no more than 1% of its volume and a volumetric meat-to-oxygen ratio of 300:1 or more. In order to maintain the foregoing oxygen content limitations, the final package is partially evacuated and gas flushed with carbon dioxide, nitrogen or combinations thereof to not only delay external surface deterioration but to also prevent internal deterioration for a period of time well beyond the time ultimate consumption would have passed under prevailing marketing conditions.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention.

What is claimed as new is as follows:

1. A method of preparing a meat product comprising the steps of: hot boning a freshly slaughtered animal carcass to obtain meat which under ambient conditions remains in a warm and fluent state for a limited period of time; comminuting said hot honed meat in a warm and fluent state during said limited period of time; initially packaging said meat immediately following comminution; chilling and shaping the packaged, comminuted meat; and sealing the shaped meat within a gas-impermeable packaging material with a volumetric ratio of meat to oxygen of meat to oxygen of at least approximately 300:1.

2. The method of claim 1 wherein said initially packaged meat is shaped by chilling the same to a temperature between 28° F. and 42° F. and slicing the chilled meat at said temperature, one or more of the slices being repackaged in the gas-impermeable packaging material.

3. The method of claim 2 including the step of flushing the head space with a perservative gas while repackaging the meat in said gas-impermeable material to reduce the oxygen content.

4. The method of claim 3 wherein the meat is initially packaged within a gas-impermeable material.

5. The method of claim 4 including the step of storing the initially packaged meat in frozen storage prior to reshaping thereof.

6. The method of claim 1 wherein the meat is initially packaged within a gas-impermeable material.

7. The method of claim 6 including the step of storing the initially packaged meat in frozen storage prior to reshaping thereof.

8. The method of claim 7 wherein said initially packaged meat is shaped by chilling the same to a temperature between 28° F. and 42° F. and slicing the chilled meat at said temperature, one or more of the slices being repackaged in the gas-impermeable packaging material.

9. The method of claim 1 including the step of flushing the head space with a perservative gas while repackaging the meat in said gas-impermeable material to reduce the oxygen content.

10. The method of claim 1 including the step of storing the initially packaged meat in frozen storage prior to reshaping thereof.

11. The method of claim 1 wherein the meat is initially packaged in a gas-permeable material.

12. A method of preparing a meat product comprising the steps of: hot boning a freshly slaughtered animal carcass to obtain meat which under ambient conditions remains in a warm and fluent state for a limited period of time; comminuting said hot boned meat in a warm and fluent state during said limited period of time; initially packaging said meat immediately following comminution; dividing said initially packaged meat into portion-sized shapes; repackaging the portion-sized shapes of meat in a gas-impermeable package; and internally flushing the package with a preservative gas during repackaging to reduce the quantity of oxygen entrapped with the repackaged meat to a volumetric ratio of meat to oxygen of at least approximately 300:1.

13. The method of claim 12 wherein the air entrapped during said initial packaging of the meat is less than approximately 12% of enclosed volume.

14. The method of claim 13 wherein the entrapped oxygen is reduced to a head space oxygen content of no more than approximately 1% by volume.

15. The method of claim 12 wherein the entrapped oxygen is reduced to a head space oxygen content of no more than approximately 1% by volume.

16. The method of claim 12 wherein the animal carcass is beef.

17. The method of claim 12 wherein the animal carcass is poultry.

18. The method of claim 12 wherein the animal carcass is pork.

19. The method of claim 12 wherein the animal carcass is veal.

20. A method of preparing a meat product, comprising the steps of hot boning a freshly slaughtered animal carcass to obtain meat which under ambient conditions remains in a warm and fluent condition for a limited period of time; comminuting said hot boned meat in a warm and fluent state during said limited period of time; chilling said comminuted meat to a temperature below which the meat is no longer warm and fluent; shaping said chilled meat into sized portions and sealing the meat within a gas-impermeable packaging material such that the volumetric ratio of meat to oxygen within the sealed package is at least approximately 300:1.

21. The method of claim 20 wherein the sealed meat is subsequently frozen for prolonged storage.

22. The method of claim 1 wherein the shaped meat is sealed within the gas-impermeable packaging material with a head space oxygen content of no more than approximately 1% by volume.

23. The method of claim 9 wherein the preservation gas is selected from the group consisting of carbon dioxide, nitrogen and a mixture of carbon dioxide and nitrogen.

References Cited

UNITED STATES PATENTS 3,193,392  7/1965  Lundquist et al. _____ 99—174

OTHER REFERENCES

Titchenal et al., Defensive Publication Ser. No. 742,410, filed July 3, 1968.

HYMAN LORD, Primary Examiner

U.S. Cl. X.R.

99—108